United States Patent
Jang et al.

(10) Patent No.: US 7,864,866 B2
(45) Date of Patent: Jan. 4, 2011

(54) SYSTEM AND METHOD OF DECODING DUAL VIDEO SIGNALS

(75) Inventors: Woo-Young Jang, Seoul (KR); Soon-Jae Cho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1401 days.

(21) Appl. No.: 11/326,152

(22) Filed: Jan. 5, 2006

(65) Prior Publication Data

US 2006/0159184 A1 Jul. 20, 2006

(30) Foreign Application Priority Data

Jan. 14, 2005 (KR) ...................... 10-2005-0003816

(51) Int. Cl.
*H04N 7/18* (2006.01)

(52) U.S. Cl. ............................. 375/240.25; 375/240.26
(58) Field of Classification Search ........................ 375/240.25–240.29; 348/715–722
See application file for complete search history.

(56) References Cited

U.S. PATENT DOCUMENTS

| 5,892,535 A * | 4/1999 | Allen et al. .................... 725/36 |
| 6,111,611 A * | 8/2000 | Ozkan et al. ................. 348/465 |
| 6,141,059 A | 10/2000 | Boyce et al. ................. 348/565 |
| 6,714,259 B2 * | 3/2004 | Kim ........................... 348/706 |
| 6,922,739 B2 * | 7/2005 | Core ........................... 710/22 |
| 7,174,561 B2 * | 2/2007 | Bixby et al. .................. 725/93 |
| 2005/0117654 A1 | 6/2005 | Im ........................ 375/240.26 |

FOREIGN PATENT DOCUMENTS

| JP | 2003-153257 | 5/2003 |
| KR | 1020000024711 A | 5/2000 |
| KR | 1020010038985 A | 5/2001 |
| KR | 10-2001-0069140 | 7/2001 |
| KR | 1020010069140 A | 7/2001 |

* cited by examiner

*Primary Examiner*—Andy S Rao
(74) *Attorney, Agent, or Firm*—F. Chau & Associates, LLC

(57) ABSTRACT

A video decoding system capable of decoding compressed high definition (HD) MPEG video signals incoming from different channels includes a first channel video decoder, a second channel video decoder, a video signal processor and an arbiter, where the first and second channel video decoders decode video streams incoming from different channels to generate decoded video streams and request signals, the video signal processor performs signal processing on the decoded video streams, and the arbiter grants control of the video signal processor to the first and second channel video decoders.

16 Claims, 9 Drawing Sheets

SYSTEM AND METHOD OF DECODING DUAL VIDEO SIGNALS

CROSS-REFERENCE TO RELATED APPLICATIONS

This application claims foreign priority under 35 U.S.C. §119 to Korean Patent Application No. 2005-3816, filed on Jan. 14, 2005, which is herein incorporated by reference in its entirety.

BACKGROUND OF THE INVENTION

1. Field of the Invention

The present disclosure relates to video signal decoding systems and methods for decoding video signals, and more particularly to video signal decoding systems and methods for decoding compressed high definition video signals incoming from different channels.

2. Description of the Related Art

Recently, as high definition (HD) digital broadcasting has been carried out, digital televisions having various functions have been developed. Some digital televisions have functions such as picture-in-picture (PIP) and double window display that use technology of decoding MPEG video streams incoming from different channels.

In order to decode MPEG video streams incoming from different channels, two discrete MPEG decoder chips have been used or an expensive MPEG decoder chip including two video decoders has been used.

FIG. 1 and FIG. 2 are block diagrams illustrating conventional video decoding systems for decoding and displaying two HD video signals, which are also disclosed in U.S. Patent Application Publication No. 2004-0028142. FIG. 1 shows a conventional video decoding system 10 for decoding and displaying two HD video signals. The conventional system 10 has two video decoders. Each of the video decoders included in the video decoding system 10 includes a buffer, a variable length decoder VLD, an inverse quantizer IQ, an inverse discrete cosine transformer IDCT and a motion compensation circuit MC. As exemplified by the system 10, when each of the video decoders has the same kind of building blocks arranged individually, the video decoding system may be simple but the video decoding system may have a large chip size when implemented on semiconductor integrated circuits.

FIG. 2 shows a conventional video decoding system 20 for decoding and displaying two HD video signals. The video decoding system 20 includes buffers 301 and 305, a variable length decoder 302 and a motion compensation circuit MC that are used commonly for the two compressed HD video signals incoming from different channels. Thus, the video decoding system 20 of FIG. 2 may have a relatively smaller chip size than the system 10 of FIG. 1 when implemented on semiconductor integrated circuits. Unfortunately, the video decoding system 20 still includes two inverse quantizers IQ and two inverse discrete cosine transformers IDCT for the two compressed HD video signals incoming from different channels.

Further, the conventional video decoding systems 10 and 20 shown in FIG. 1 and FIG. 2, respectively, perform signal processing on video streams with respect to pictures. Thus, the efficiency of time division is not high enough. In addition, in the conventional video decoding systems 10 and 20, the period of the decoding synchronization signal may be generated irregularly and the decoded video signal may be displayed irregularly when decoding is performed using a mixed mode of a frame picture and a field picture or using a 3:2 pull-down decoding, for example.

SUMMARY OF THE INVENTION

The present disclosure provides a dual video decoding system capable of decoding compressed high definition (HD) MPEG video signals incoming from different channels. The present disclosure also provides a method of decoding dual video signals that are compressed HD MPEG video signals incoming from different channels.

According to some embodiments of the present disclosure, there is provided a video decoding system including a first channel video decoder, a second channel video decoder, a video signal processor and an arbiter. The first channel video decoder decodes a first video stream incoming from a first channel to generate a first decoded video stream and a first request signal. The second channel video decoder decodes a second video stream incoming from a second channel to generate a second decoded video stream and a second request signal. The video signal processor performs an inverse quantization, an inverse discrete cosine transformation and a motion compensation on the first decoded video stream or the second decoded video stream. The arbiter grants control of the video signal processor to the first channel video decoder or the second channel video decoder when the video signal processor is in an idle state in response to the first request signal or the second request signal.

The video signal processor may perform an inverse quantization, an inverse discrete cosine transformation and a motion compensation on the first decoded video stream or the second decoded video stream with respect to each slice.

According to some embodiments of the present disclosure, there is provided a method of decoding video signals including decoding a first video stream incoming from a first channel to generate a first decoded video stream and a first request signal using a first channel video decoder; decoding a second video stream incoming from a second channel to generate a second decoded video stream and a second request signal using a second channel video decoder; performing an inverse quantization, an inverse discrete cosine transformation and a motion compensation on the first decoded video stream or the second decoded video stream; and granting control of the video signal processor to the first channel video decoder or the second channel video decoder when the video signal processor is in an idle state in response to the first request signal or the second request signal.

According to some embodiments of the present disclosure, there is provided a video decoding system including a plurality of video decoders, an arbiter and a video signal processor. Each of the plurality of video decoders is disposed in signal communication with one of a plurality of incoming video channels to generate a corresponding plurality of decoded video streams and request signals, respectively. The arbiter is disposed in signal communication with the plurality of video decoders for receiving the request signals and selecting one of the plurality of decoded video streams responsive to the request signals and a current state, in which the current state is indicative of the video signal processor being idle. The video signal processor disposed in signal communication with the arbiter for receiving the selected decoded video stream and applying at least one of an inverse quantization, an inverse discrete cosine transformation or a motion compensation. The arbiter may grant control of the video signal processor to each one of the plurality of video decoders when that video decoder generates a request signal and the video signal processor reaches an idle state. Each of the decoded video streams may include a motion vector, a quantized value and a discrete cosine transformation coefficient, respectively.

BRIEF DESCRIPTION OF THE DRAWINGS

The foregoing and other features and advantages of the disclosure will be apparent from the more particular description of embodiments of the disclosure, as illustrated in the accompanying drawings. The drawings are not necessarily to scale, emphasis instead being placed upon illustrating the principles of the disclosure. Like reference numerals may refer to like elements throughout the drawings.

DETAILED DESCRIPTION OF PREFERRED EMBODIMENTS

Detailed illustrative embodiments of the present disclosure are disclosed herein. However, specific structural and functional details disclosed herein are merely representative for purposes of describing exemplary embodiments of the present disclosure.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
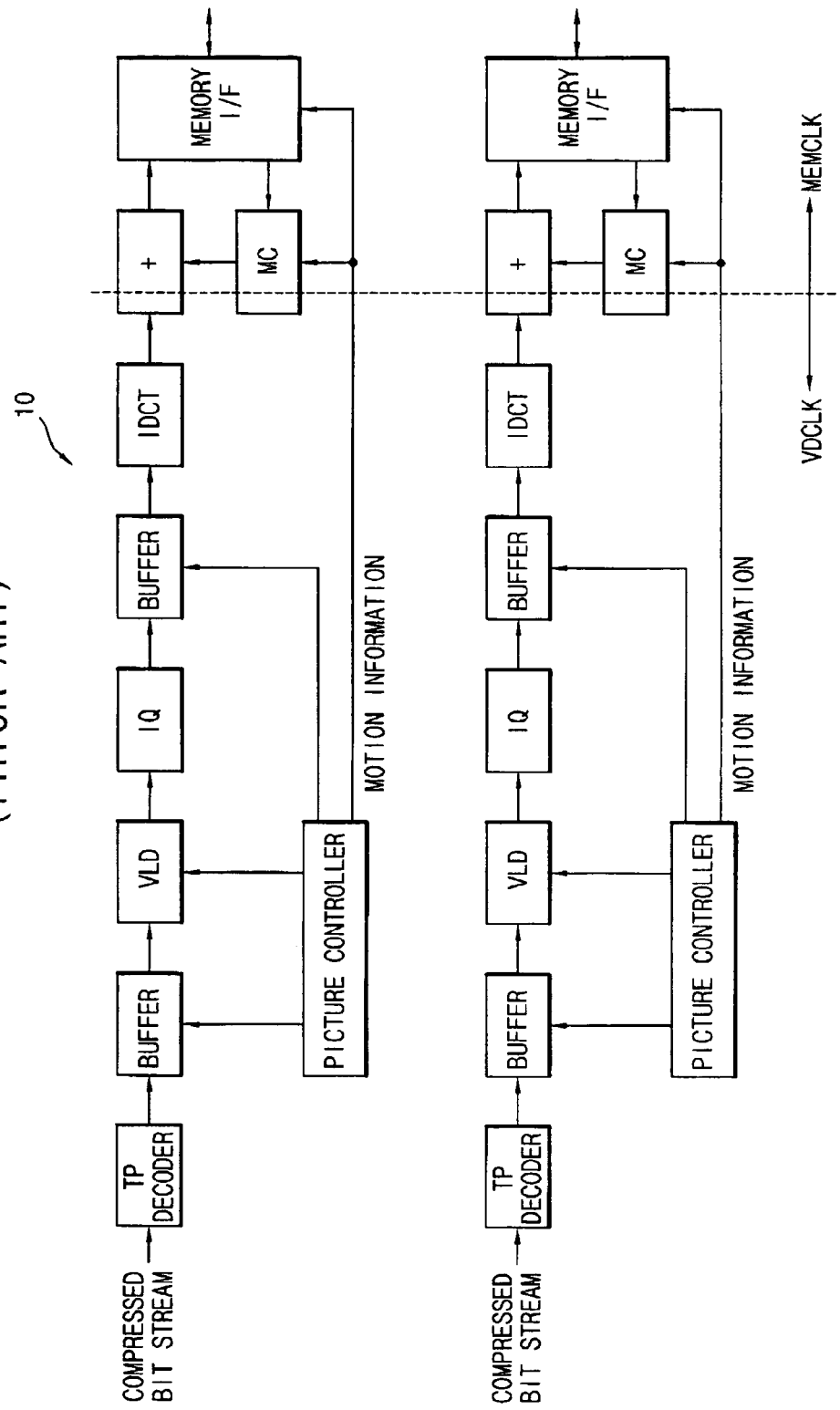
FIG. 1 is a block diagram illustrating a conventional video decoding system for decoding and displaying two high definition (HD) video signals.
Figure 2:
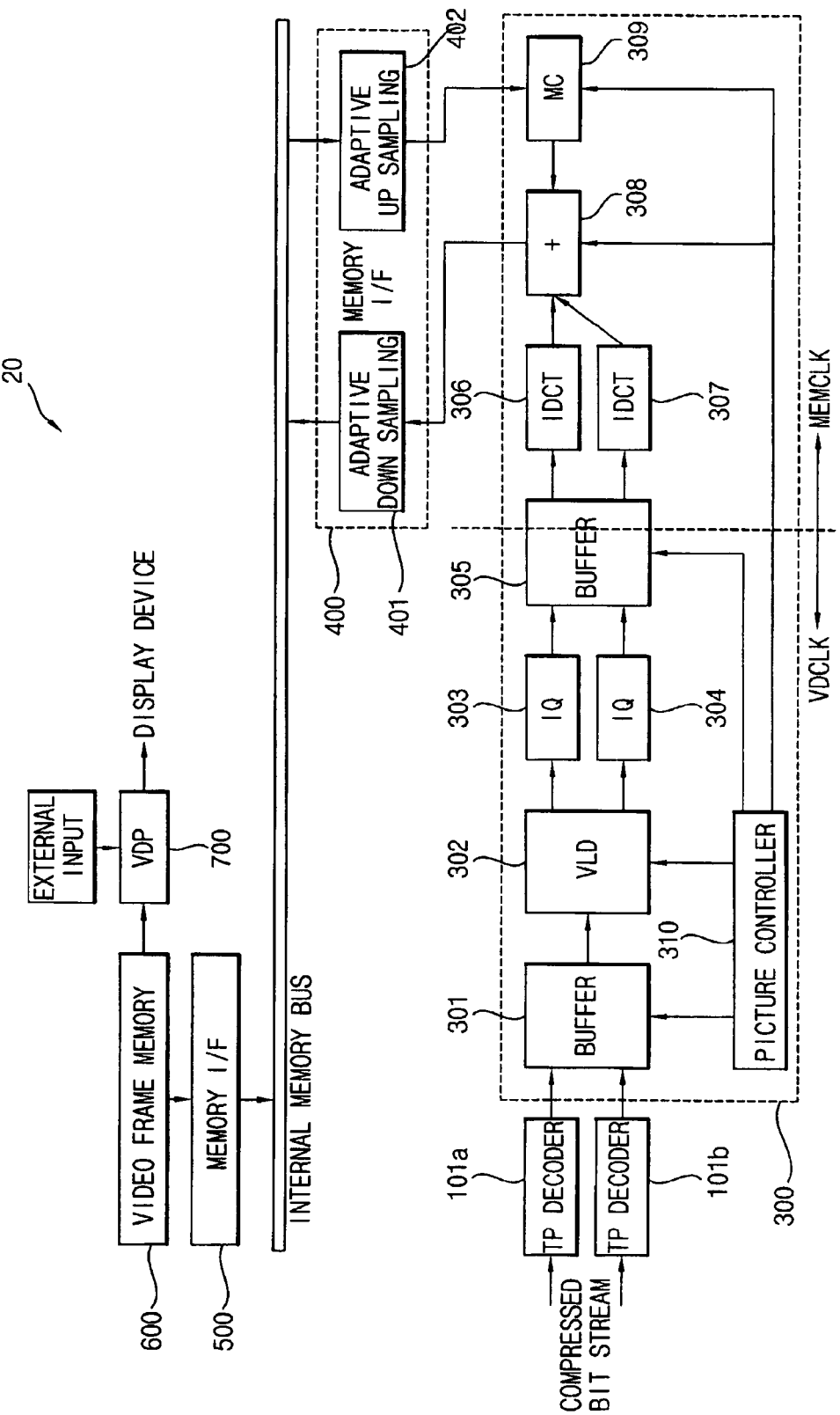
FIG. 2 is a block diagram illustrating another conventional video decoding system for decoding and displaying two HD video signals.
Figure 3:
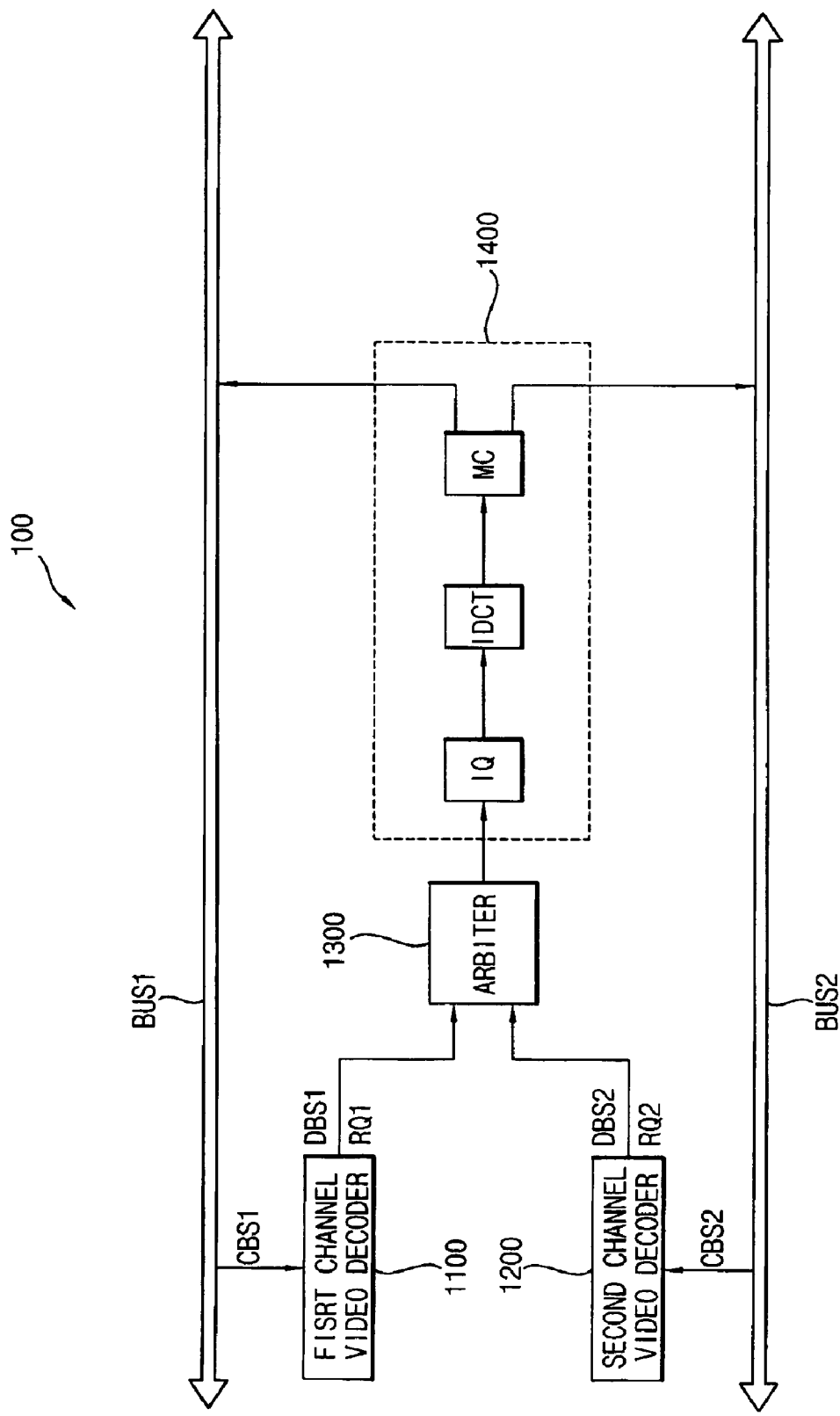
FIG. 3 is a block diagram illustrating a dual video decoding system for decoding and displaying two HD video signals according to one exemplary embodiment of the present disclosure.

FIG. 3 is a block diagram illustrating a dual video decoding system 100 for decoding and displaying two high definition (HD) video signals according to one exemplary embodiment of the present disclosure. Referring to FIG. 3, the dual video decoding system 100 includes a first channel video decoder 1100, a second channel video decoder 1200, a video signal processor 1400 and an arbiter 1300.

The first channel video decoder 1100 decodes a first video stream CBS1 incoming from a first bus BUS1 to generate a first decoded video stream DBS1 and a first request signal RQ1. The second channel video decoder 1200 decodes a second video stream CBS2 incoming from a second bus BUS2 to generate a second decoded video stream DBS2 and a second request signal RQ2.

The video signal processor 1400 performs an inverse quantization, an inverse discrete cosine transformation and a motion compensation on the first decoded video stream DBS1 or the second decoded video stream DBS2.

The arbiter 1300 grants control of the video signal processor 1400 to the first channel video decoder 1100 or the second channel video decoder 1200 when the video signal processor 1400 is in an idle state in response to the first request signal RQ1 or the second request signal RQ2.

The video signal processor 1400 includes an inverse quantizer IQ, an inverse discrete cosine transformer IDCT and a motion compensation circuit MC. The inverse quantizer IQ inversely quantizes discrete cosine transformation coefficients in response to quantized values. The inverse discrete cosine transformer IDCT performs an inverse discrete cosine transformation on the inversely quantized discrete cosine transformation coefficients. The motion compensation circuit MC performs a motion compensation on a pixel value of a present frame using motion vectors and a prior frame stored in a memory.

In FIG. 3, each of the first and second decoded video streams DBS1 and DBS2 includes a motion vector, a quantized value and a discrete cosine transformation coefficient.

Hereinafter, referring to FIG. 3, the operation of the dual video decoding system 100 according to an exemplary embodiment of the present disclosure will be described.

The first channel video decoder 1100 and the second channel video decoder 1200 access the video signal processor 1400 through the arbiter 1300. When the first request signal RQ1 from the first channel video decoder 1100 is in an active state, the arbiter 1300 determines whether the video signal processor 1400 is in an idle state. When the video signal processor 1400 is in an idle state, the arbiter 1300 grants control of the video signal processor 1400 to the first channel video decoder 1100. The signal processing in the video signal processor 1400 may be performed with respect to each slice. The arbiter 1300 withdraws control of the video signal processor 1400 from the first channel video decoder 1100 when signal processing on the first decoded video stream DBS1 is over. In the same way, when the second request signal RQ2 from the second channel video decoder 1200 is in an active state, the arbiter 1300 determines whether the video signal processor 1400 is in an idle state. When the video signal processor 1400 is in an idle state, the arbiter 1300 grants control of the video signal processor 1400 to the second channel video decoder 1200. The arbiter 1300 withdraws control of the video signal processor 1400 from the second channel video decoder 1200 when signal processing on the second decoded video stream DBS2 is over.

The dual video decoding system 100 performs an inverse discrete cosine transformation and a motion compensation on the video stream with respect to slices. Therefore, the efficiency of time division is high and decoded video signals may be displayed in a regular form.

Figure 4:
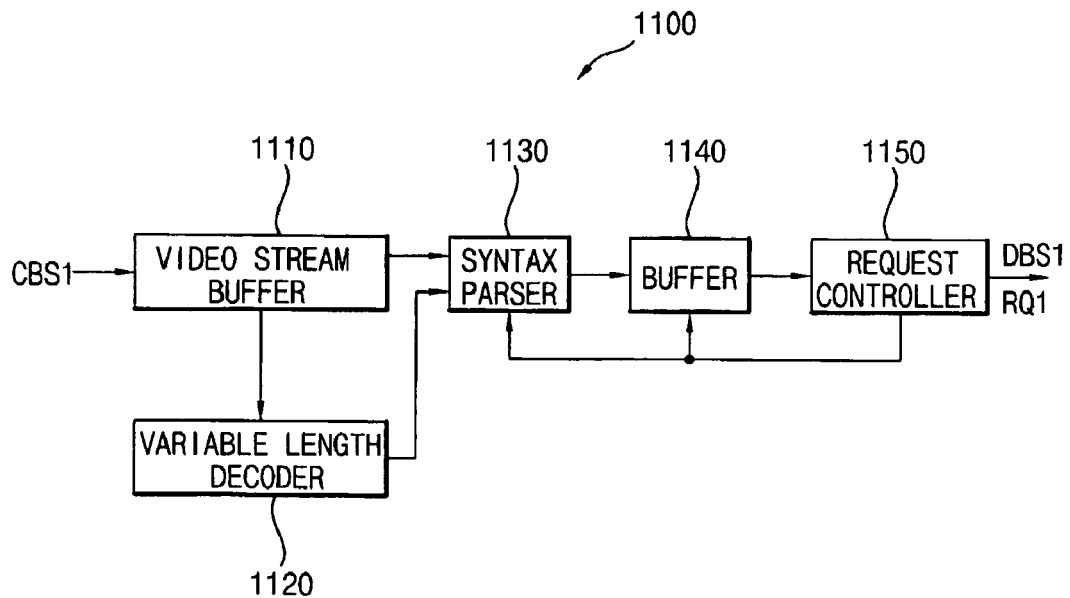
FIG. 4 is a block diagram illustrating a first channel video decoder included in the dual video decoding system of FIG. 3.

FIG. 4 is a block diagram illustrating a first channel video decoder included in the dual video decoding system of FIG. 3. Referring to FIG. 4, the first channel video decoder 1100 includes a video stream buffer 1110, a variable length decoder 1120, a syntax parser 1130, a buffer 1140 and a request controller 1150.

The video stream buffer 1110 temporarily stores a first video stream CBS1. The variable length decoder 1120 performs variable length decoding on the first video stream CBS1 received from the first video stream buffer 1110 to generate a motion vector, a quantized value and a discrete cosine transformation coefficient.

The syntax parser 1130 decodes header information of the first video stream CBS1. Further, the syntax parser 1130 performs signal processing on the first motion vector, the first quantized value and the first discrete cosine transformation coefficient to generate the first request signal RQ1.

The buffer 1140 temporarily stores the decoded header information of the first video stream, the motion vector, the quantized value and the discrete cosine transformation coefficient. The request controller 1150 requests the control of the video signal processor 1400 from the arbiter 1300 in response to the first request signal RQ1. Further, the request controller 1150 informs the syntax parser 1130 and the buffer 1140 that the request controller 1150 requests the control of the video signal processor 1400 from the arbiter 1300.Figure The header information of the first video stream CBS1 outputted from the video stream buffer 1110 is decoded in the syntax parser 1130. The variable length decoder 1120 performs a variable length decoding on the first video stream CBS1 received from the first video stream buffer 1110 to generate a motion vector, a quantized value and a discrete cosine transformation (DCT) coefficient. The decoded header information of the first video stream, the motion vector, the quantized value, the discrete cosine transformation coefficient and the first request signal RQ1 are temporarily stored in the buffer 1140. The request controller 1150 determines whether the first request signal RQ1 is in an active state. When the first request signal RQ1 is in an active state, the request controller 1150 requests control of the video signal processor 1400 from the arbiter 1300.

Figure 5:
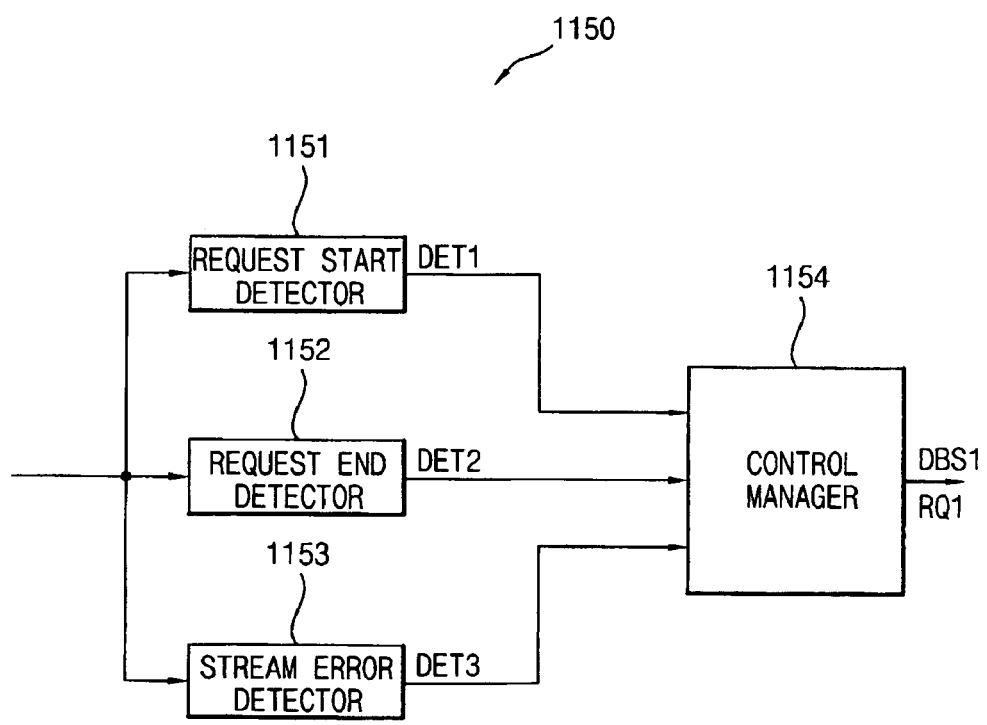
FIG. 5 is a block diagram illustrating an exemplary embodiment of a request controller included in the first channel video decoder of FIG. 4.

FIG. 5 is a block diagram illustrating an exemplary embodiment of a request controller 1150 included in the first channel video decoder 1100 of FIG. 4. Referring to FIG. 5, the request controller 1150 includes a request start detector 1151, a request end detector 1152, a stream error detector 1153 and a control manager 1154.

The request start detector 1151 detects a start of a request to use the video signal processor 1400 to generate a first detection signal DET1. The request end detector 1152 detects an end of the request to use the video signal processor 1400 to generate a second detection signal DET2. The stream error detector 1153 detects whether errors are included in the first video stream CBS1 to generate a third detection signal DET3. The control manager 1154 requests the control of the video signal processor 1400 from the arbiter 1300 in response to the first to third detection signals DET1 to DET3.

Figure 6:
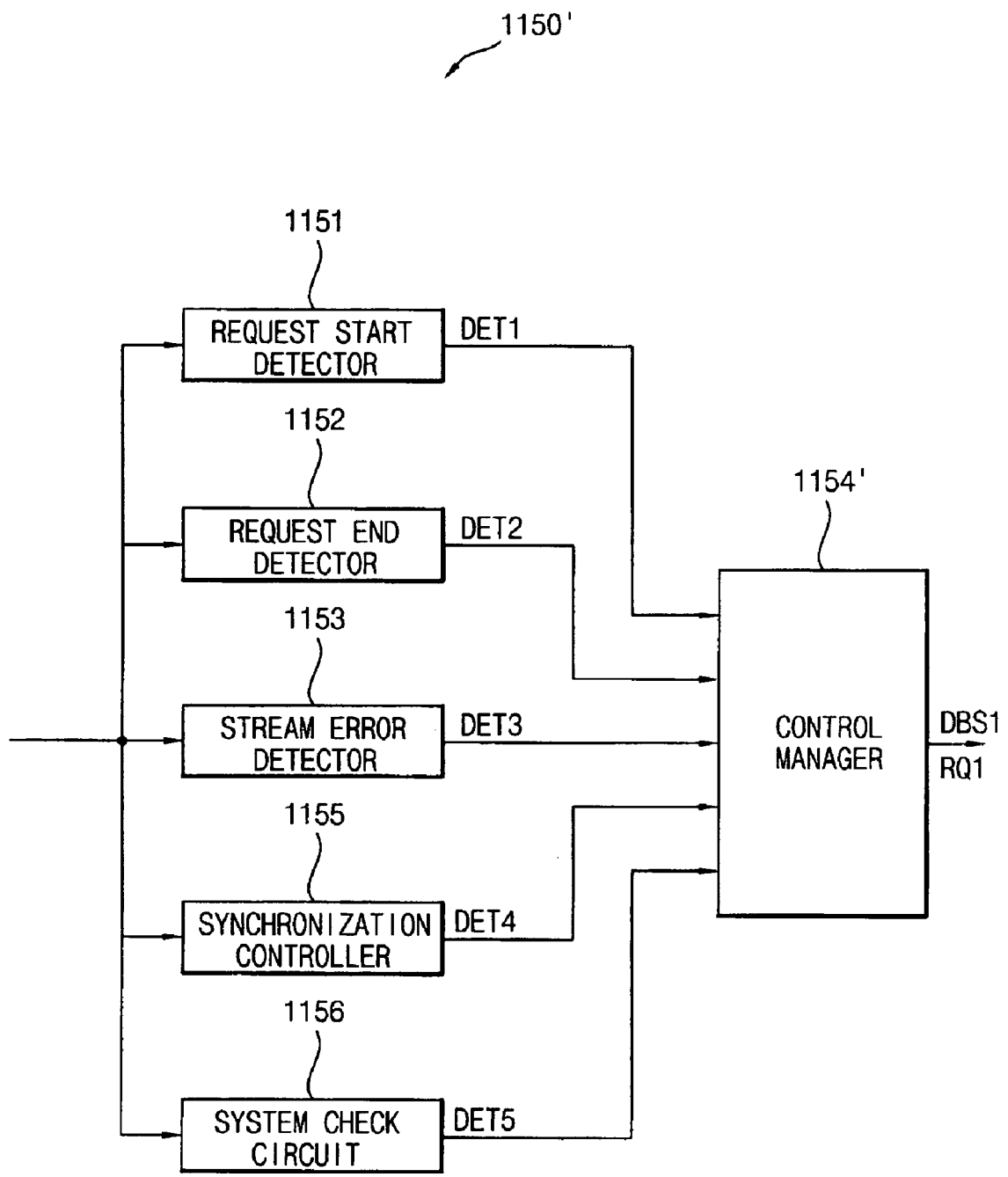
FIG. 6 is a block diagram illustrating another exemplary embodiment of a request controller included in the first channel video decoder of FIG. 4.

FIG. 6 is a block diagram illustrating another exemplary embodiment of a request controller 1150' included in the first channel video decoder of FIG. 4. Referring to FIG. 6, the request controller 1150' includes a request start detector 1151, a request end detector 1152, a stream error detector 1153, a synchronization controller 1155, a system check circuit 1156 and a control manager 1154'. The request start detector 1151, a request end detector 1152 and a stream error detector 1153 operate in the same way as those of the request controller of FIG. 5.

The synchronization controller 1155 generates a synchronization control signal DET4 for adjusting a synchronization of the first channel video decoder 1100 and the video signal processor 1400. The system check circuit 1156 detects a state of the video decoding system such as overflow and underflow to generate a system state signal DET5.

The control manager 1154' requests the control of the video signal processor 1400 from the arbiter 1300 in response to the first to third detection signals DET1 to DET3, the synchronization control signal DET4 and the system state signal DET5.

Figure 7:
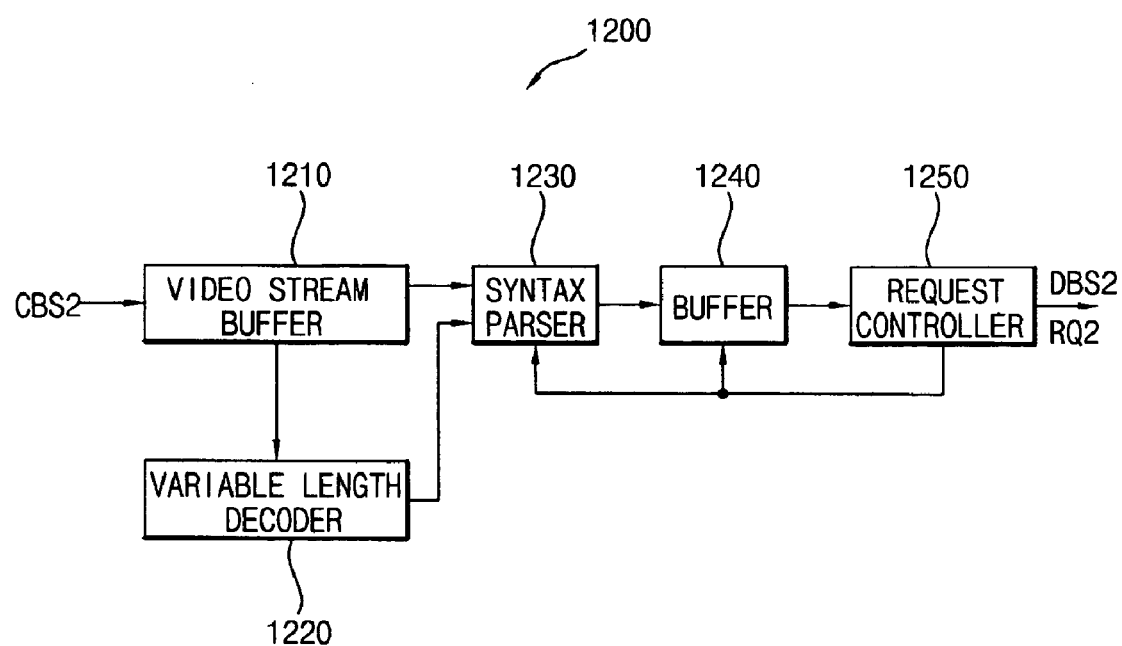
FIG. 7 is a block diagram illustrating a second channel video decoder included in the dual video decoding system of FIG. 3.

FIG. 7 is a block diagram illustrating a second channel video decoder 1200 included in the dual video decoding system of FIG. 3. The second channel video decoder 1200 has the same circuit structure as the first channel video decoder of FIG. 4, but has different input and output signals from that of FIG. 4. Referring to FIG. 7, the second channel video decoder 1200 includes a video stream buffer 1210, a variable length decoder 1220, a syntax parser 1230, a buffer 1240 and a request controller 1250.

The video stream buffer 1210 temporarily stores a second video stream CBS2. The variable length decoder 1220 performs a variable length decoding on the second video stream CBS2 received from the second video stream buffer 1210 to generate a motion vector, a quantized value and a discrete cosine transformation coefficient.

The syntax parser 1230 decodes a header information of the second video stream CBS2. Further, the syntax parser 1230 performs a signal processing on the first motion vector, the first quantized value and the first discrete cosine transformation coefficient to generate the second request signal RQ2.

The buffer 1240 temporarily stores the decoded header information of the second video stream, the motion vector, the quantized value and the discrete cosine transformation coefficient. The request controller 1250 requests the control of the video signal processor 1400 from the arbiter 1300 in response to the second request signal RQ2. Further, the request controller 1250 informs the syntax parser 1230 and the buffer 1240 that the request controller 1250 requests the control of the video signal processor 1400 from the arbiter 1300.

The operation of the second channel video decoder 1200 of FIG. 7 is similar to that of the first channel video decoder 1100 of FIG. 4. Therefore, the operation of the second channel video decoder 1200 of FIG. 7 will not be described in further detail here.

Figure 8:
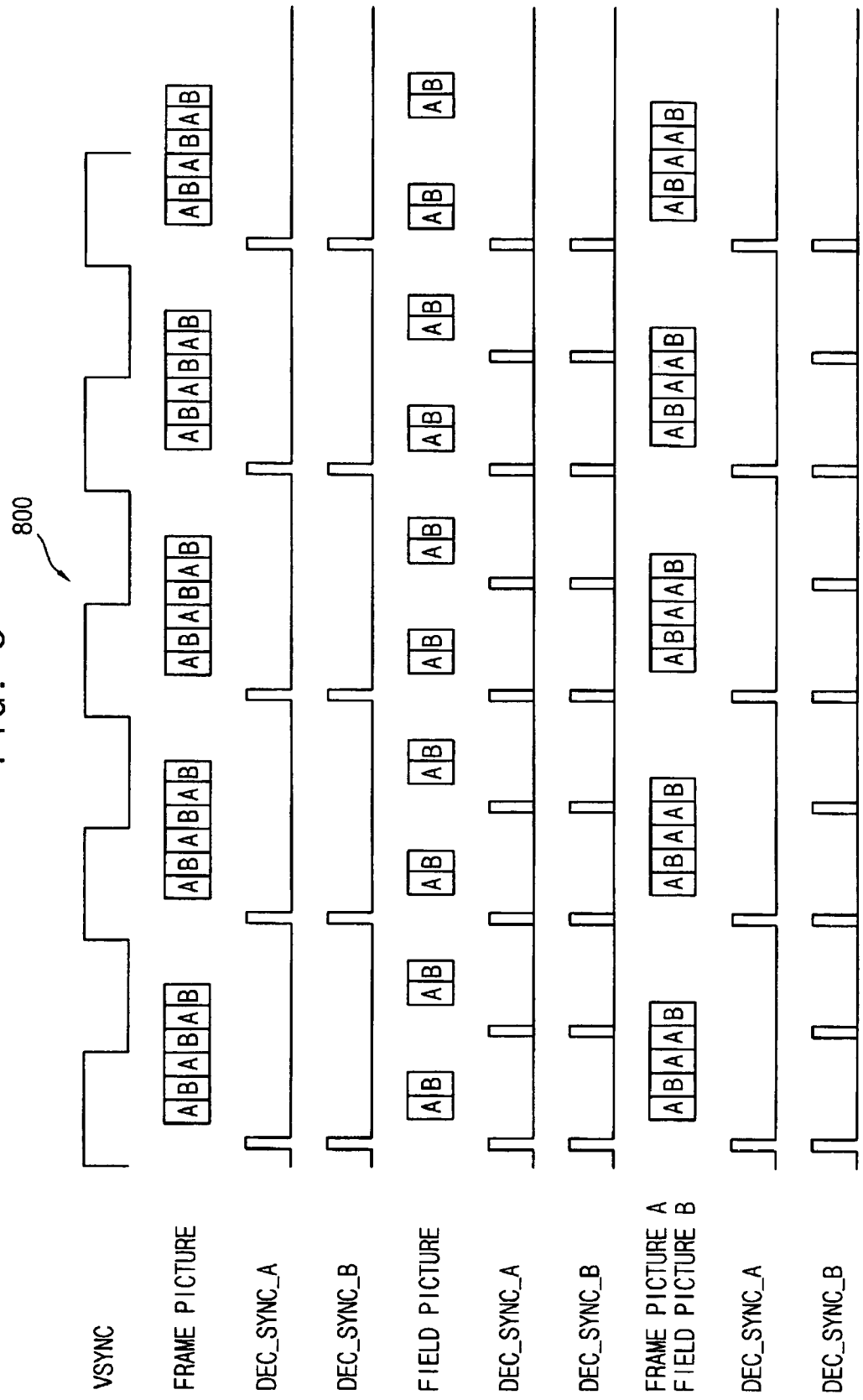
FIG. 8 is a timing diagram illustrating an operation of the dual video decoding system of FIG. 3 when decoding is performed using a mixed mode of a frame picture and a field picture.

FIG. 8 shows a timing diagram 800 illustrating an operation of the dual video decoding system of FIG. 3 when decoding is performed using a mixed mode of a frame picture and a field picture.

In FIG. 8, VSYNC denotes a vertical synchronization signal, DEC_SYNC_A denotes a decoding synchronization signal for a first channel video signal, and DEC_SYNC_B denotes a decoding synchronization signal for a second channel video signal. Further, A and B denote picture slices for the first channel video signal and the second channel video signal, respectively.

As will be understood from FIG. 8, in the decoding system 100 according to an example of the present disclosure, the first channel video decoder 1100 and the second channel video decoder 1200 access the video signal processor 1400 with respect to slices to perform signal processing. Thus, decoding signals DEC_SYNC_A and DEC_SYNC_B are generated in a regular form when decoding is performed using a mixed mode of a frame picture and a field picture.

Figure 9:
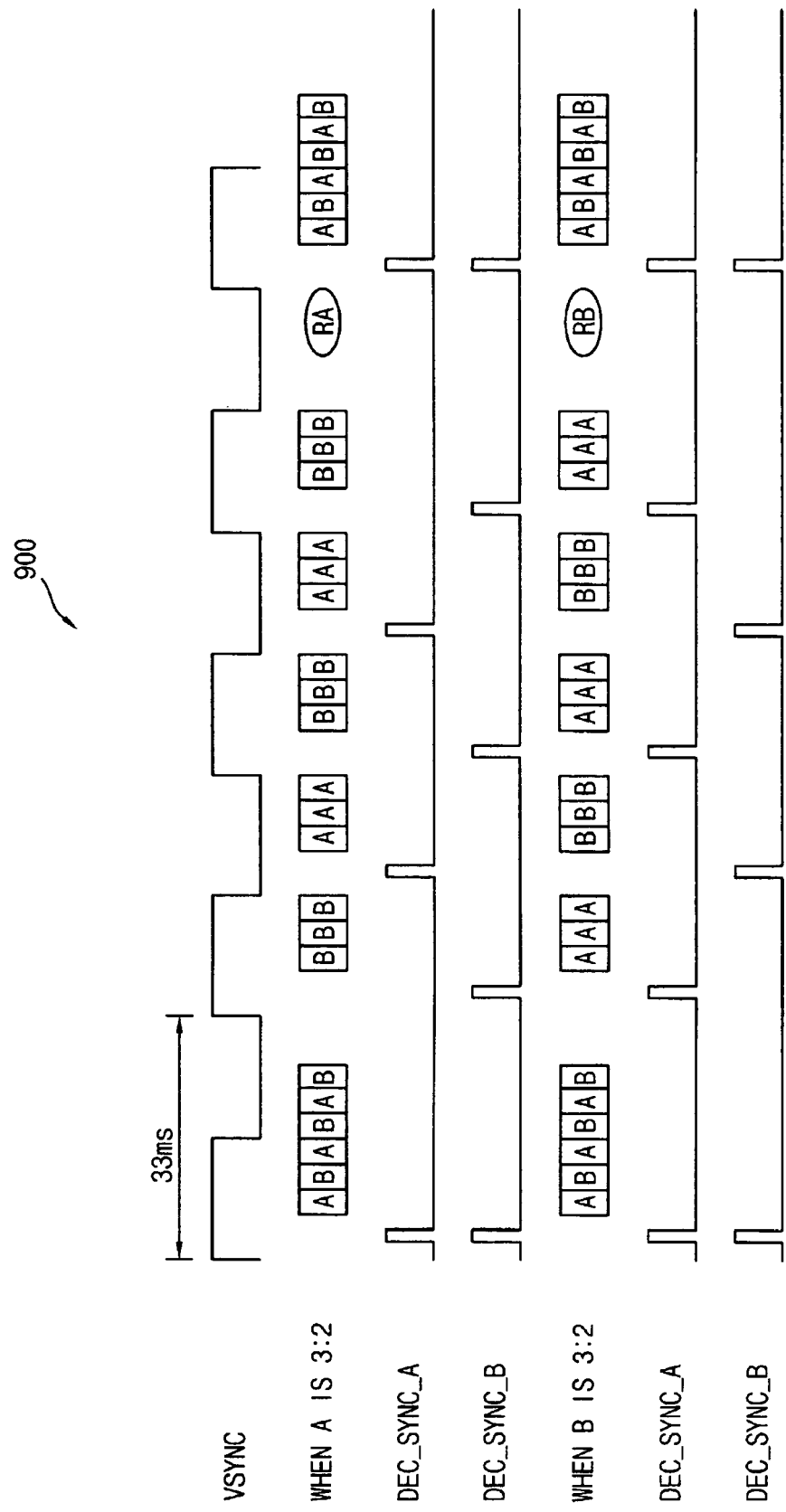
FIG. 9 is a timing diagram illustrating an operation of the dual video decoding system of FIG. 3 when decoding is performed using a 3:2 pull-down decoding.

FIG. 9 shows a timing diagram 900 illustrating an operation of the dual video decoding system of FIG. 3 when decoding is performed using a 3:2 pull-down decoding.

When A is 3:2, that is when the first channel video decoder performs a 3:2 pull-down decoding, A is repeated (RA). At this time, the decoding synchronization signal DEC_SYNC_A is not generated. In the same way, when B is 3:2, that is when the second channel video decoder performs a 3:2 pull-down decoding, B is repeated (RB). At this time, the decoding synchronization signal DEC_SYNC_B is not generated.

As will be understood from FIG. 9, in the decoding system 100 according to an example of the present disclosure, the first channel video decoder 1100 and the second channel video decoder 1200 access the video signal processor 1400 with respect to slices to perform signal processing. Thus, decoding signals DEC_SYNC_A and DEC_SYNC_B are generated in a regular form when decoding is performed using a 3:2 pull-down decoding.

Figure 10A:
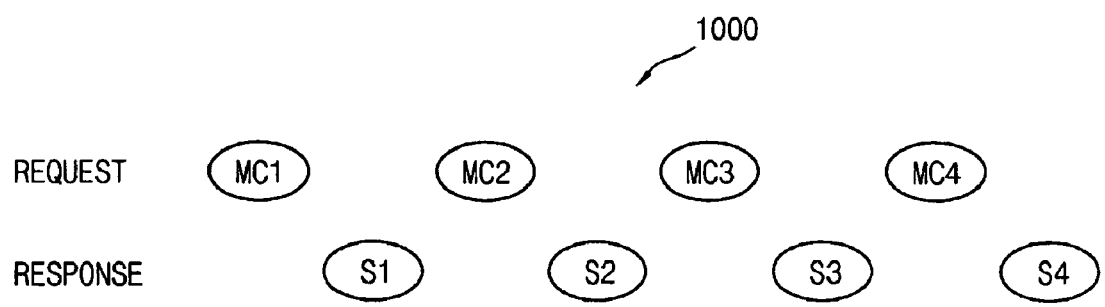
FIG. 10A and FIG. 10B are diagrams illustrating methods for increasing the speed of a motion compensation circuit.
Figure 10B:
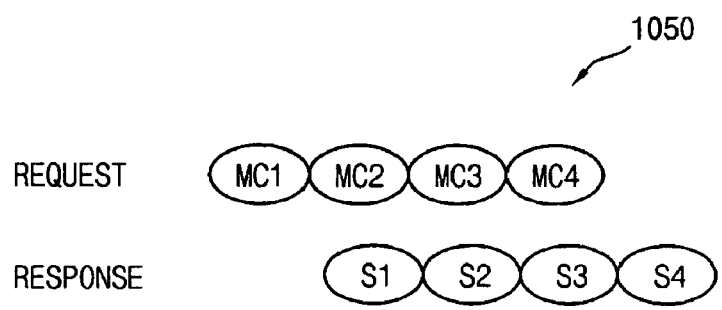

FIG. 10A and FIG. 10B are diagrams illustrating methods for increasing the speed of a motion compensation circuit.

FIG. 10A is a diagram representing a method 1000 for motion compensation, where request signals MC1 to MC4 for motion compensation are read one at a time, and response signals S1 to S4 for motion compensation are generated one at a time.

FIG. 10B is a diagram representing a method 1050 for motion compensation, where request signals MC1 to MC4 for motion compensation are read at the same time, and response signals S1 to S4 for motion compensation are generated at the same time. If all the request signals are read at the same time and all the responses are executed at the same time, the time needed to perform a motion compensation may be reduced.

As mentioned above, a video signal decoding system and method according to the present disclosure can decode compressed HD MPEG video signals incoming from different channels. Further, video signal decoding systems according to the present disclosure may consume relatively low power and may occupy a relatively small chip area when implemented in semiconductor integrated circuits. Further, the video signal decoding system according to the present disclosure may have high efficiency of time division.

While the exemplary embodiments of the present disclosure and their advantages have been described in detail, it shall be understood that various changes, substitutions and alterations may be made herein without departing from the scope of the invention as defined by appended claims.

What is claimed is:

1. A video decoding system, comprising:
   a first channel video decoder configured to decode a first video stream incoming from a first channel to generate a first decoded video stream and a first request signal;
   a second channel video decoder configured to decode a second video stream incoming from a second channel to generate a second decoded video stream and a second request signal;
   a shared video signal processor configured to perform an inverse quantization, an inverse discrete cosine transformation and a motion compensation on the first decoded video stream or the second decoded video stream; and
   an arbiter configured to grant control of the shared video signal processor to the first channel video decoder or the second channel video decoder when the shared video signal processor is in an idle state in response to the first request signal or the second request signal.

2. The video decoding system of claim 1, wherein the video signal processor is configured to perform the inverse quantization, the inverse discrete cosine transformation and the motion compensation on the first decoded video stream or the second decoded video stream with respect to slices.

3. The video decoding system of claim 2, wherein the first decoded video stream includes a first motion vector, a first quantized value and a first discrete cosine transformation coefficient, and the second decoded video stream includes a second motion vector, a second quantized value and a second discrete cosine transformation coefficient.

4. The video decoding system of claim 3, wherein the first channel video decoder comprises:
   a video stream buffer configured to store the first video stream;
   a variable length decoder configured to perform a variable length decoding on the first video stream received from the first video stream buffer to generate the first motion vector, the first quantized value and the first discrete cosine transformation coefficient;
   a syntax parser configured to decode a header information of the first video stream to generate the first request signal;
   a buffer configured to temporarily store the decoded header information of the first video stream, the first motion vector, the first quantized value and the first discrete cosine transformation coefficient; and
   a request controller configured to request the control of the video signal processor from the arbiter in response to the first request signal.

5. The video decoding system of claim 4, wherein the syntax parser is configured to temporarily store the first motion vector, the first quantized value and the first discrete cosine transformation coefficient and provide the first motion vector, the first quantized value and the first discrete cosine transformation coefficient to the buffer.

6. The video decoding system of claim 4, wherein the request controller is configured to inform the syntax parser and the buffer that the request controller requests the control of the video signal processor when the request controller requests the control of the video signal processor.

7. The video decoding system of claim 4, wherein the syntax parser is configured to perform a signal processing on the first motion vector, the first quantized value and the first discrete cosine transformation coefficient.

8. The video decoding system of claim 3, wherein the second channel video decoder comprises:

a video stream buffer configured to store the second video stream;

a variable length decoder configured to perform a variable length decoding on the second video stream received from the first video stream buffer to generate the first motion vector, the first quantized value and the first discrete cosine transformation coefficient;

a syntax parser configured to decode a header information of the first video stream and perform a signal processing on the second motion vector, the second quantized value and the second discrete cosine transformation coefficient to generate the second request signal;

a buffer configured to temporarily store the decoded header information of the second video stream, the second motion vector, the second quantized value and the second discrete cosine transformation coefficient; and a request controller configured to request the control of the video signal processor from the arbiter in response to the second request signal.

9. The video decoding system of claim 8, wherein the request controller is configured to inform the syntax parser and the buffer that the request controller requests the control of the video signal processor when the request controller requests the control of the video signal processor.

10. The video decoding system of claim 3, wherein the video signal processor comprises:

an inverse quantizer configured to inversely quantize the first discrete cosine transformation coefficient in response to the first quantized value and configured to inversely quantize the second discrete cosine transformation coefficient in response to the second quantized value;

an inverse discrete cosine transformer configured to perform the inverse discrete cosine transformation on the first inversely-quantized discrete cosine transformation coefficient and the second inversely-quantized discrete cosine transformation coefficient; and a motion compensation circuit configured to perform a motion compensation on a pixel value of a present frame using the first motion vector, the second motion vector and a prior frame stored in a memory.

11. The video decoding system of claim 10, wherein the motion compensation circuit is configured to perform a plurality of requests on the motion compensation at one time.

12. A method of decoding video signals, comprising:

decoding a first video stream incoming from a first channel to generate a first decoded video stream and a first request signal using a first channel video decoder;

decoding a second video stream incoming from a second channel to generate a second decoded video stream and a second request signal using a second channel video decoder;

granting control of a shared video signal processor to the first channel video decoder or the second channel video decoder when the shared video signal processor is in an idle state in response to the first request signal or the second request signal; and performing an inverse quantization, an inverse discrete cosine transformation and a motion compensation on the first decoded video stream or the second decoded video stream in accordance with the granted control using the shared video signal processor.

13. The method of decoding video signals of claim 12, wherein the first decoded video stream includes a first motion vector, a first quantized value and a first discrete cosine transformation coefficient, and the second decoded video stream includes a second motion vector, a second quantized value and a second discrete cosine transformation coefficient.

14. A video decoding system comprising:

a plurality of video decoders, each disposed in signal communication with one of a plurality of incoming video channels to generate a corresponding plurality of decoded video streams and request signals, respectively;

an arbiter disposed in signal communication with the plurality of video decoders for receiving the request signals and selecting one of the plurality of decoded video streams responsive to the request signals and a current state; and a shared video signal processor disposed in signal communication with the arbiter for receiving the selected decoded video stream and applying at least one of an inverse quantization, an inverse discrete cosine transformation or a motion compensation, wherein the current state is indicative of the shared video signal processor being idle.

15. The video decoding system of claim 14 wherein the arbiter grants control of the video signal processor to each one of the plurality of video decoders when that video decoder generates a request signal and the video signal processor reaches an idle state.

16. The video decoding system of claim 15, wherein each of the decoded video streams includes a motion vector, a quantized value and a discrete cosine transformation coefficient, respectively.

* * * * *